Feb. 3, 1931.  A. E. CHURCH  1,790,744
CHUCK
Filed Nov. 20, 1926
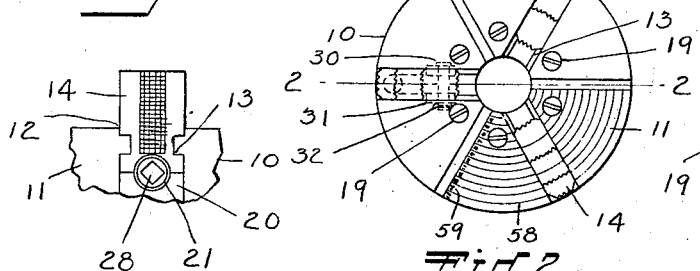
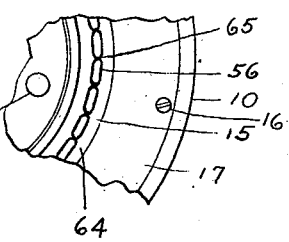
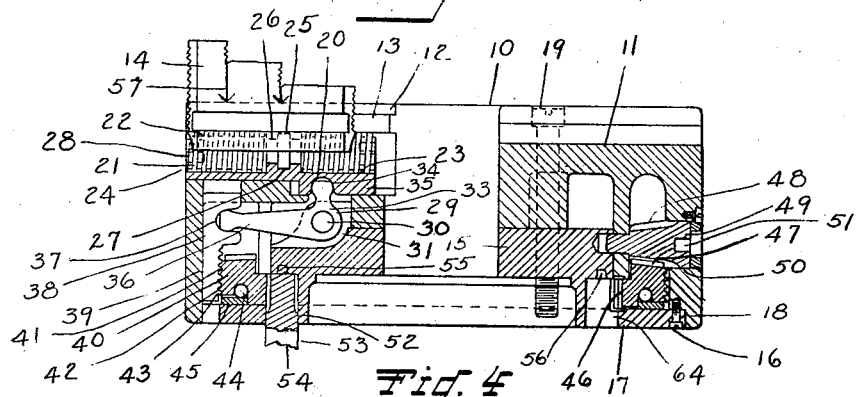
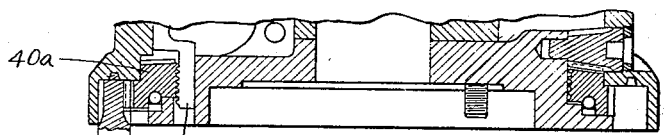
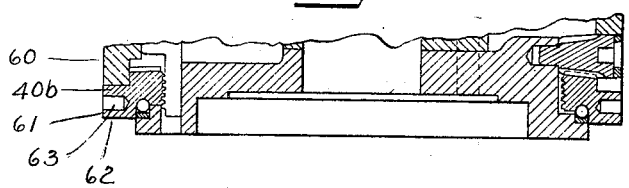
Inventor:
Albert E. Church.
Louis M. Schmidt.
Atty.

Patented Feb. 3, 1931

1,790,744

UNITED STATES PATENT OFFICE

ALBERT E. CHURCH, OF NEW BRITAIN, CONNECTICUT

CHUCK

Application filed November 20, 1926. Serial No. 149,646.

My invention relates to improvements in chucks, of the form that is known as machine chucks, having a set of jaws that travel in radial ways for effecting the adjustment for work of different diameters, and the object of my improvement is to produce a chuck that is adapted for heavy duty and that is adapted to have the jaws set in various ways, as in one form, either by hand or by means of a motor, and in another form involving some change in details, by hand either substantially directly or by means of a gear drive, and also, that can be arranged to be set by power derived from the main spindle or shaft through the medium of suitable interconnecting gearing.

In the accompanying drawing:—

Figure 1 is an end face view of a chuck embodying my invention.

Figure 2 is a sectional view on the line 2—2 of Fig. 1, on a reduced scale.

Figure 3 is an edge view of one of the jaws and the adjacent parts.

Figure 4 is a sectional view corresponding to Fig. 2 of a modification.

Figure 5 is a similar sectional view on another modification.

Figure 6 is a fragmentary rear elevation of the form that is shown in Figs. 1 and 2 showing the recesses in the back for receiving the positioning tip of the shaft for the motor or power driven setting mechanism.

My improved chuck 10 comprises a body 11 that has a set of radially directed chambers 12 that are open at the front to provide slots 13 through which project the jaws 14, the latter being of stepped form.

The body 11 is opposed to and encloses the back 15 and a ring 17, secured by means of screws 16, to said body, completes the housing.

The back 15 is chambered to provide for housing various devices to be described and is closed at the rear by means of said ring or annular plate 17, said plate being admitted into a recess 18.

The structure as a whole is supported from a face-plate by means of screws 19 in the forms that are shown. In some cases the back may be screw-threaded for engaging with the screw-threaded nipple or stem on the lathe spindle.

In each of the radial chambers 12 there is operatively housed for sliding movement a cup or carriage 20 in the form of an elongated block-like structure, and in which is housed the screw 21.

The screw 21 is immediately back of the jaw 14 and the opposed portions 22 thereof have screw-threaded engagement.

The cup 20 has a chamber 23 for operatively housing the screw 21 and the rear portion 24 of said screw 21 has screw-threaded engagement with the opposed portion of said cup 20.

Thus means are provided for effecting relative to and fro movement of the cup and the screw as one part and the jaw as another part.

The screw 21 is positioned in the cup 20 as follows:—At the middle of the screw 21 is an integral collar-like projection 25 that is supported by a reduced portion 26 of cylindrical form.

A recess 27 is provided in the cup 20 that fits the collar 25.

The screw 21 has an opening 28 in the end for a wrench.

The cup 20 is moved to and fro by means of a bell-crank lever 29 that is supported from the back 15 by a pin 30 that is held in place in suitable bearings 31 by means of a cotter-pin 32.

The short end 33 of the lever 29 projects forwardly into a recess 34 in an enlargement 35 of the cup 20, the opposed faces being rounded so as to permit of operative engagement for moving the cup responsive to movements of the lever.

The long end 36 of the lever 29 projects outwardly generally radially and by its extreme end engages within a recess 37 in the opposed face of a plunger 38 and which is housed in suitable ways 39 for to and fro movement in parallelism with the axis of the chuck.

Longitudinal movements of the plunger 38 are effected through the medium of a worm connection with a large ring 40, and which is located so as to cooperate with the rear end portion 41 of said plunger. Said rear end portion 41 of the plunger 38 has a worm-rack 42 on the inside face and the ring 40 has a screw-thread or worm on the periphery 43.

The rear end portion of the ring 40 rides on a set of balls 44 that are backed by a bearing-ring 45.

The ring 40 may be rotated in various ways and to this end teeth may be provided on either the inside face or border face 46 of the opening or on the top face 47. As shown, teeth are provided on both of the faces named, and means are provided for engaging with the teeth on each of said faces.

For cooperating with the top face 47 there is provided a pinion gear 48 that is part of a stub-shaft structure 49 that is operatively housed in any proper manner in a radial chamber 50 and that has the outer end face exposed and provided with a non-circular opening 51 for a wrench.

For cooperating with the inside face 46 there is provided means for using a pinion gear 52 that is part of a removable and separate shaft structure 53 that is located in parallelism with the axis of the chuck and that may have the main or body portion 54 connected in any desired manner with a motor for power operation.

As shown, the shaft structure 53 is provided at the front end with a tip 55 that is relatively reduced and tapered and that is entered into a cooperating recess 56 in the structure of the back 15.

Rotation of either pinion gear serves to rotate the ring and through the intervening connections to move the cups and the jaws supported thereby.

The jaws 14 are provided on one side face with longitudinally directed scratch-lines or marks 57 that cooperate with a set of rings 58 having markings 59 for setting the jaws for a particular diameter of work, the rings 58 being spaced at one-half inch intervals.

In the structure that is shown in Fig. 4 the ring 40a extends around the outside of the plunger 38a and is inside the power setting shaft 53a.

In the structure that is shown in Fig. 5 the gear ring 40b is exposed through the side wall 60 of the back end portion of the chuck structure, the exposed portion being the outside cylindrical face 61 of a radial annular extension 62 and which has a set of radial openings 63 that are adapted for selective use for receiving a pin for directing rotating the ring 40b and thereby effecting a relatively quick setting of the jaws.

With reference to the recess 56 for receiving the tip 55 of the power shaft 53, a set of such recesses is provided, arranged in a circle, as indicated in Fig. 6, for selective use and these are exposed and accessible through an open channel space 64 at the rear of the chuck. Said recesses 56 are closely adjacent, being separated by a thin wall 65. The individual recesses 56 fit the tip 55 closely at the sides and in length, along the middle circumferential line, may have a length about three times the diameter of said tip 55.

I claim as my invention:—

1. In a chuck, a body having radial ways, jaw bases operating in said ways, a bell-crank for each of said bases; pivotally supported in said body; having a short arm that is engaged with the base, adjacent the inner end thereof; and having a long arm that is directed outwardly from the pivotal support, a ring mounted for rotation in said body, means for rotating said ring, said ring having a radius longer than the radial distance of the jaw base pivotal support from the axis, and means operatively connecting each of said long arms with said ring.

2. In a chuck as described in claim 1, said last named means being in the form of a single piece plunger with the ends respectively positively connected the one with the long arm and the other with the ring.

3. In a chuck having a body, jaw bases mounted for movement therein and a ring, mounted for rotation, serving as the means for moving said bases, drive means for said ring, housed in said body, and directed along a radial axis, and said ring being provided with teeth that are available for drive means that operate on an axis that is in parallelism with the axis of the chuck.

4. In a chuck, a body provided with radial guide-ways, jaws supported by bases that are slidable in said guide-ways, a relatively large ring housed for rotation in said body, teeth or the like on one face of said ring for cooperating with a power-driven pinion for effecting a holding pressure on work held in said jaws, and additional means for cooperation with hand operated means for use in effecting an initial setting of the jaws and also for effecting a cumulative holding pressure on said work after the application of such power effected holding pressure.

5. In a chuck, a body provided with a plurality of radial guide-ways, jaw bases slidable in said guide-ways, a ring housed in said body for rotation, a bell-crank pivotally mounted in said body for each of said bases; having a short arm engaged with the adjacent base; and provided with a radially extended long arm, and a set of plungers, each in the form of a single piece structure that is guided in said body for to and fro movement, serving individually as connecting means intermediate the corresponding arm and said ring, one end of the plunger being connected to the long arm and the other end thereof to the ring, the said long arms of the bell-cranks being directed outwardly from the pivotal supports for the said bell-cranks, the plunger in each case being located outwardly beyond the arm and having a notch in one of the side faces for cooperating with the opposed free end of the corresponding long arm.

6. In a chuck, a body provided with a plurality of radial guide-ways, jaw bases slidable in said guide-ways, a ring housed in said body for rotation, a bell-crank pivotally mounted in said body, for each of said bases; having a short arm engaged with the adjacent base; and provided with a radially extended long arm and a set of plungers, each in the form of a single piece structure that is guided in said body for to and fro movement, serving individually as connecting means intermediate the corresponding arm and said ring, one end of the plunger being connected to the long arm and the other end thereof to the ring, means for driving said ring for shifting said bases in the form of a spur gear, said ring having teeth on one face for cooperating with said gear, said teeth and the axis of said gear being parallel with the axis of the chuck, and said body being open at the rear for permitting removal of said gear by a movement in parallelism with the axis.

7. In a chuck, a body provided with a plurality of radial guide-ways, jaw bases slidable in said guide-ways, a ring housed in said body for rotation, a bell-crank pivotally mounted in said body for each of said bases; having a short arm engaged with the adjacent base; and provided with a radially extended long arm, and a set of plungers, each in the form of a single piece structure that is guided in said body for to and fro movement, serving individually as connecting means intermediate the corresponding arm and said ring, one end of the plunger being connected to the long arm and the other end thereof to the ring, driving means in the form of a spur gear for operating said ring, said body being provided with an annular recess or channel in the rear face, teeth on said ring for engaging with said gear for effecting such operation, said teeth being exposed along one side of said channel, a guide-tip on said end of the gear, and said bottom of the channel being provided with a set of recesses arranged concentric with the axis for admitting said tip for selectively positioning said gear relatively to the chuck body.

8. In a chuck, a body provided with a plurality of radial guide-ways, jaw bases slidable in said guide-ways, a ring housed in said body for rotation, a bell-crank pivotally mounted in said body for each of said bases; having a short arm engaged with the adjacent base; and provided with a radially extended long arm, and a set of plungers, each in the form of a single piece structure that is guided in said body for to and fro movement, serving individually as connecting means intermediate the corresponding arm and said ring, one end of the plunger being connected to the long arm and the other end thereof to the ring, said ring having teeth for driving on one face, said body being recessed for admitting removable drive means to said teeth.

ALBERT E. CHURCH.